(12) United States Patent
Kaplan

(10) Patent No.: US 8,090,161 B2
(45) Date of Patent: Jan. 3, 2012

(54) SYSTEMS AND METHOD FOR SIGNATURE VERIFICATION

(76) Inventor: Christiane Kaplan, Langewiesen (DE)

( * ) Notice: Subject to any disclaimer, the term of this patent is extended or adjusted under 35 U.S.C. 154(b) by 829 days.

(21) Appl. No.: 11/425,083

(22) Filed: Jun. 19, 2006

(65) Prior Publication Data

US 2007/0292002 A1 Dec. 20, 2007

(51) Int. Cl.
*G06K 9/00* (2006.01)

(52) U.S. Cl. .................... 382/119; 382/201

(58) Field of Classification Search ............... 382/119, 382/120, 121, 122, 207
See application file for complete search history.

(56) References Cited

U.S. PATENT DOCUMENTS

| | | | | |
|---|---|---|---|---|
| 4,736,445 | A * | 4/1988 | Gundersen | 382/120 |
| 5,202,930 | A * | 4/1993 | Livshitz et al. | 382/122 |
| 5,680,470 | A * | 10/1997 | Moussa et al. | 382/119 |
| 5,930,380 | A * | 7/1999 | Kashi et al. | 382/119 |
| 6,160,914 | A * | 12/2000 | Muroya | 382/187 |
| 6,487,310 | B1 * | 11/2002 | Bishop et al. | 382/186 |
| 6,947,029 | B2 * | 9/2005 | Katagiri et al. | 345/158 |
| 7,068,821 | B2 * | 6/2006 | Matsutani | 382/119 |
| 7,263,211 | B2 * | 8/2007 | Yoshii et al. | 382/119 |
| 2003/0233557 | A1 * | 12/2003 | Zimmerman | 713/186 |
| 2004/0156537 | A1 * | 8/2004 | Chung et al. | 382/119 |
| 2005/0033704 | A1 * | 2/2005 | Kirk | 705/67 |
| 2007/0274537 | A1 * | 11/2007 | Srinivasan | 381/94.3 |

OTHER PUBLICATIONS

Chan F. Lam et al, "Signature Recognition through Spectral Analysis", Apr. 1987, Acoustics, Speech, and Signal Processing, IEEE International Conference on ICASSP, '87, vol. 12, pp. 1790-1792.*
S. Impedovo et al, "A Spectral Analysis-Based Signature Verification System", 1989, Springer Berlin/Heidelberg, Lecture notes in Computer Science vol. 399, pp. 316-323.*

* cited by examiner

*Primary Examiner* — Gregory M Desire
(74) *Attorney, Agent, or Firm* — David I. Roche; Baker & McKenzie LLPx

(57) ABSTRACT

The signature verification methods and devices disclosed herein can be used to verify signatures signed on electronic key pads and other input devices, such as signature pens. Many different aspects of a dynamic signature can be measured in an attempt to verify the signature, including, but not limited to spatial measurements, measurements over time, and frequency. These measurements can be of points on a signature, but they can also be pressure, velocity, and acceleration, to name just a few. These different aspects can then be analyzed using, for example, time series, and spectral similarities. Further, the spectral similarities can be analyzed using wavelet-transforms. In another embodiment, these analysis systems and methods can be applied to written signatures as well as dynamic written signatures.

26 Claims, 6 Drawing Sheets

SYSTEMS AND METHOD FOR SIGNATURE VERIFICATION

BACKGROUND

1. Field of the Invention

The field of the invention relates generally to the field of identity verification, and more particularly, to signature verification.

2. Background of the Invention

Signature verification is an important tool used to verify identity in a number of situations. For example, it is common to verifying a signature or signatures on financial instruments, including, for example, checks. Other forms of identity verification exist, but unfortunately identity theft is on the rise. Conventional forms of identity verification, including matching the appearance of two or more signatures, have drawbacks. For example, in some cases forgers can duplicate the appearance of a person's signature.

Signature verification is made more difficult by the fact that a person's signature can vary. In other words, the same person can sign his or her signature multiple times and the signatures will, in many cases, not be identical. Although signing a signature is a trained, highly automated and basic motor function skill it does not lead to identical signatures. It will be appreciated, for example, that individual's signature varies over time, typically becoming more abbreviated and/or sloppier.

Additionally, handwritten signatures can vary widely from individual to individual. Some people's signatures can be barely readable, while other people's signatures can be made up of easily read block letters. Perhaps the majority of signatures fall in between these two extremes.

Signature verification systems, therefore, have to allow for a wide range of variability including variability from signature to signature of one individual and the variability of different types and styles of signature from individual to individual.

To make the task of signature verification even more complex, electronic signature pads have been introduced by a variety of merchants and enterprises. Such devices allow for the capture of more data related to the signature. For example, time, spatial, and spectral information can be recorded for a signature using such devices. Unfortunately, these types of data also vary widely over time and between individuals, which increases the complexity of signature verification. Many conventional signature verification systems are unable to make use of such data to effectively verify authentic signatures, and reject false signatures, to the degree necessary.

SUMMARY

The signature verification methods and devices disclosed herein can be used to verify signatures signed on electronic key pads and/or other input devices. Many different aspects of a dynamic signature can be measured in an attempt to verify the signature, including, but not limited to spatial measurements, measurements over time, and frequency. These measurements can be of points on a signature, but they can also be pressure, velocity, and acceleration, to name just a few. These different aspects can then be analyzed using, for example, time series, and spectral similarities. Further, the spectral similarities can be analyzed using wavelet-transforms.

These and other features, aspects, and embodiments of the invention are described below in the section entitled "Detailed Description."

BRIEF DESCRIPTION OF THE FIGURES

Features, aspects, and embodiments of the inventions are described in conjunction with the attached drawings, in which.

DETAILED DESCRIPTION

Figure 1:
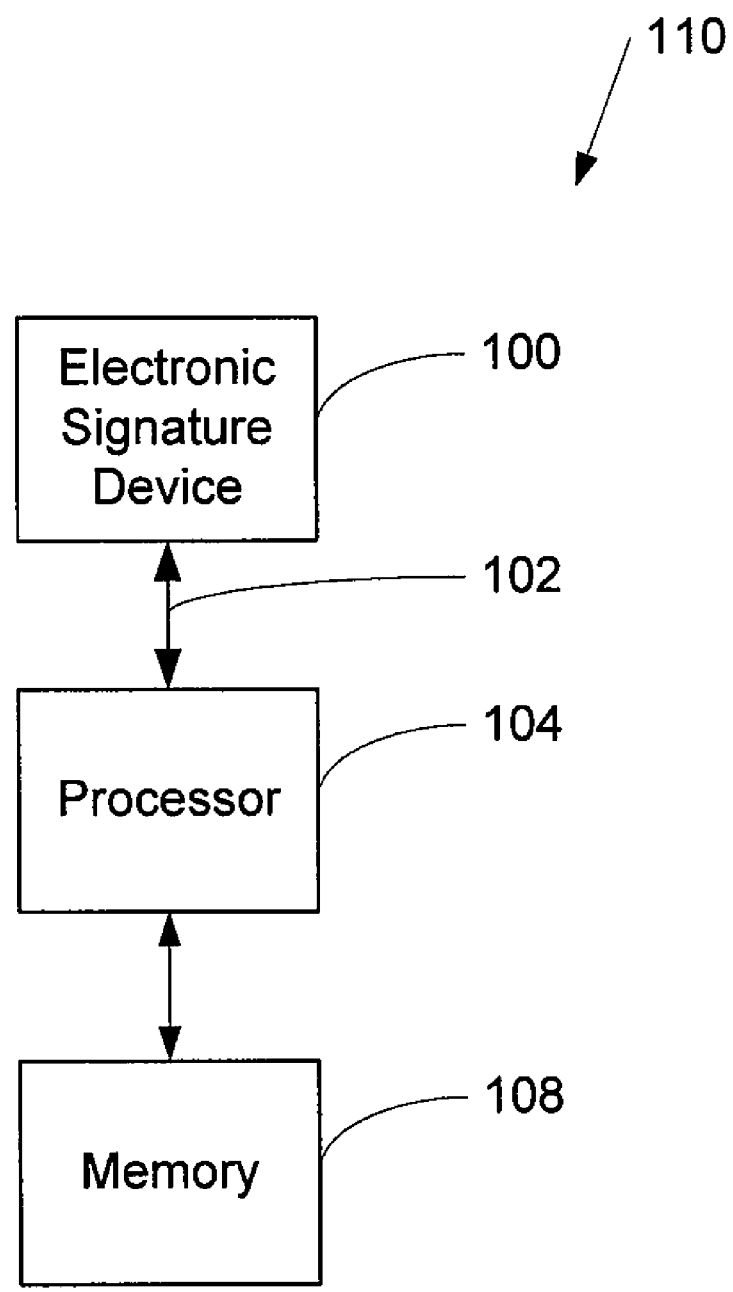
FIG. 1 is a simplified schematic diagram illustrating an example system for signature processing.

Increasingly merchants have begun to use electronic signature pads instead of paper to perform credit card transactions. Generally, a customer can authorize a credit card purchased by signing his or her signature on an electronic signature pad. These signatures are sometimes referred to as dynamic signatures, on-line signatures, or biometric signatures. The customer's authorization can then be verified against a reference signature generally stored by the credit card company.

Dynamic signatures can be described in the time, spatial, and spectral domains. For example, generally, when a customer signs a signature on an electronic signature pad an image of the signature can be available for use in verifying the signature. The image of the signature can be one example of describing the signature in the spatial domain. Additionally, however, other data related to the dynamic signature can, in some cases be available.

For example, dynamic signatures can also be described in the time domain. Generally, as a person signs his or her signature on an electronic signature pad or sign with a signature pen the progression from the start to the finish of the signature can be measured in time. For example, assume that a persons name is "Mr. Jones" and that Mr. Jones signs his name in block letters. When Mr. Jones places a pen, stylus, or other signature device on the electronic signature pad, a timer or timers can be activated. Alternatively, in an embodiment that uses a signature pen, when Mr. Jones begins writing with the signature pen a timer or timers can be activated. In each embodiment the timer or timers can be used to record the time associated with generating all or part of the signature.

For example, the amount of time required to write each letter can be stored, e.g., as Mr. Jones writes the "M" in "Mr." the timing data associated with generating the "M" can be recorded. Additionally, the amount of time required to generate different sub-parts of the letters can be stored. For example, assume Mr. Jones picks up the pen after writing "Mr", waits a moment, and then marks a "." to form "Mr." The time between writing "Mr" and "." can be stored and compared to previous time measurements to authenticate future signatures that may or may not be Mr. Jones.

Of course, the timing of these events can have some variability, as well. For example, on some days Mr. Jones may be in a hurry, and on other days Mr. Jones may be tired, which can lead to variability in the timing associated with how Mr. Jones makes his signature. A signature verification system configured in accordance with the systems and methods described herein can take into account this variability. Other examples of how a signature can be described in time include, e.g., total time to sign a signature, time between lifting the pen from the electronic signature pad, etc.

A person's signature can also be described in the spectral domain. For example, generally, when a person signs his or her signature, the pen can be moved in an up and down motion. The frequency of this up and down motion can be stored and used to authenticate the signature.

Movement of the pen can, as described above, be measured spatially, over time, and over frequency. Other characteristics of a person's signature can also be measured spatially, over time, and over frequency, depending on the capabilities of the electronic signature device, the signature verification system, or both. For example, pressure, velocity, and acceleration can be measured in order to verify a signature.

As described above, many different aspects of a dynamic signature can be measured in an attempt to verify the signature, including, but not limited to spatial measurements, measurements over time, and frequency. These measurements can be of points on a signature, but they can also be pressure, velocity, and acceleration, to name just a few.

FIG. 1 is a simplified schematic diagram illustrating an example system for signature processing configured in accordance with one embodiment of the systems and methods described herein. The diagram includes an electronic signature pad 100. Electronic signature pad 100 can be used to capture a person's signature, including one or more reference signatures, one or more signatures to be verified, or both. In one embodiment electronic signature device 100 can include multiple electronic signature devices. For example, one or more reference signatures can be captured at a bank when a person applies for a credit card. When this person attempts to make a purchase using the credit card they can sign an electronic signature pad located at the merchant where the purchase is being made. This will be discussed further below with respect to FIG. 2.

Electronic signature pad 100 can be coupled to a processor 104 using a connection 102. Connection 102 can be a wired connection, a wireless connection, or some combination of both. For example, electronic signature pad 100 can be located within the bank and can be connected directly to processor 104. Processor 104 can, for example, be located at the bank. Alternatively, electronic signature pad 100 can be located at the merchant and can be connected to processor 104 through a communication link such as a telephone or other communication device that can include both wired and wireless portions, e.g., for processors 104 that are not located at the bank. It will be understood that many different connections 102 can be used and that these can generally be selected based on the distance between processor 104 and electronic signature pad 100, e.g., local or remote.

As just described, processor 104 can be located near signature pad 100 or remotely. Additionally, processor 104 can comprise multiple processors. For example, one processor can be located at the bank while another can be located at the merchant location. This will be discussed further with respect to FIG. 2. Alternatively, multiple signature pads 100 can be connected to a single processor 104.

Processor 104 can be connected to memory 108. Memory 108 can, for example, be used to store instructions and data that can be used by processor 104 to perform signature verification. For example, memory 108 can include instructions for performing steps to verify a signature. Further, memory 108 can store data, such as signature feature vectors that can contain information about reference signatures. Memory 108 can also store data such as a signature feature vector for a signature to be verified. The instructions that can be stored in memory 108 are discussed in detail below in relation to FIG. 3.

Figure 2A:
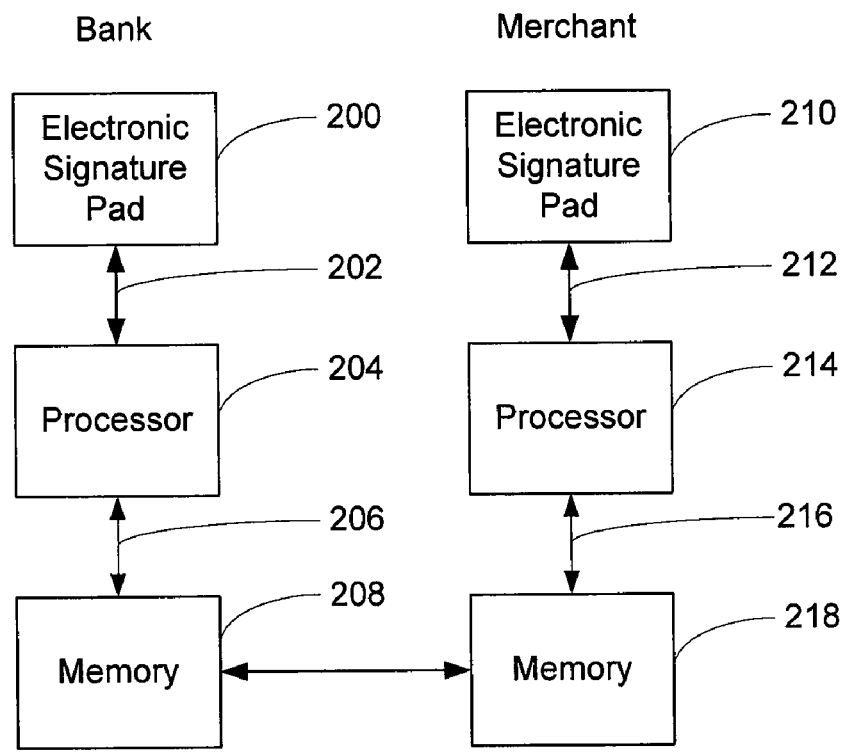
FIGS. 2A-2B are schematic diagrams illustrating an example system for signature verification.

FIG. 2A is a schematic diagram illustrating an example system for signature verification in accordance with another embodiment of the systems and methods described herein. The example system of FIG. 2A includes signature processing at a bank location and signature processing at a merchant location. Generally, when a customer establishes an account, such as, a credit card, the customer can provide the bank with one ore more sample signatures by signing his or her signature on signature pad 200. Signature pad 200 can be connected to a processor 204 through communication link 202. Processor 204 can be connected to a memory 208 by connection 206 and can process the signatures by executing instructions stored in memory 208. Additionally, processor 204 can store digital data representing the signatures in memory 208.

After the credit card account of this example has been established the customer can, from time to time, wish to make purchases from various merchants, e.g., grocery stores, clothing stores, etc. Each merchant can have an electronic signature pad 210 at the merchant's store. Similarly to the bank location, signature pad 210 can be connected to a processor 214 through communication link 212. Processor 214 can be connected to a memory 218 by connection 216 and can process the signatures by executing instructions stored in memory 218. Additionally, processor 214 can store digital data representing the signatures in memory 218. Further, memory 218 at the merchant location can be coupled to memory 208 at the bank location. In this way the merchant can get information about the reference signature or signatures from when the credit card account was opened.

Figure 2B:
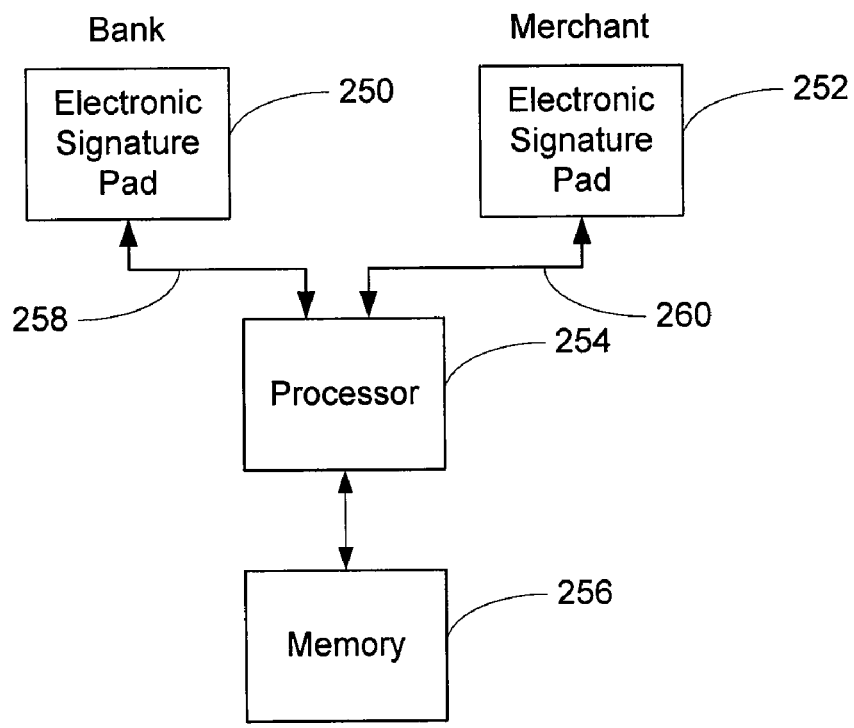

FIG. 2B is a schematic diagram illustrating an example system for signature verification in accordance with still another embodiment of the systems and methods described herein. The diagram is similar to FIG. 2A, however, in FIG. 2B an electronic signature pad 250 located at the bank and an electronic signature pad 252 located at a merchant are each connected to the same processor 254 and memory 256 through communication links 258 and 260 respectively. Communication links 258, 260 can each be, for example a telephone link. In this way processor 254 and memory 256 can be remotely located from each electronic signature pad. In another embodiment, however, processor 254 and memory 256 can be located at the bank location and the merchant electronic signature pad can be remotely located.

While FIGS. 1, 2A, and 2B illustrate example systems for signature verification it will be understood that the embodiments described are by way of example only. Accordingly, the inventions should not be limited based on the described embodiments. The electronic signature device, processors, and memory can be located and connected in a variety of locations and configurations. For example, it will be understood that the bank location and the merchant location can be the same location. For example, many grocery stores now have bank branch locations located within the grocery store. Additionally, the reference signature can be for a credit card account as with the example of FIG. 2A-2B, however, the reference signature can be for, e.g., a debit card, a checking account, etc., or for signature verification for any purpose. The systems and methods can be used to verify a person's signature for many different purposes.

Figure 3:
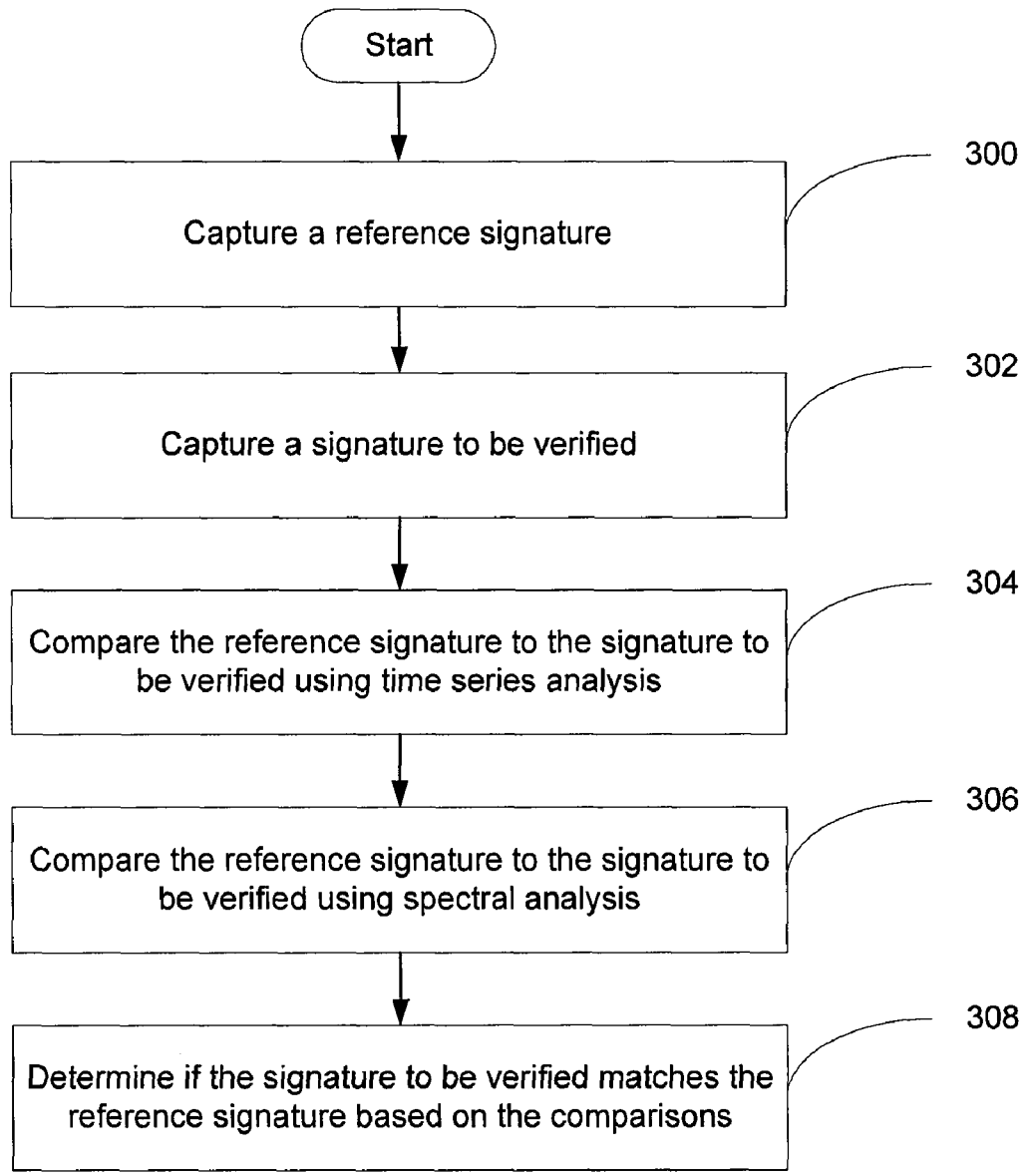
FIG. 3 is a flowchart illustrating an example of a method of signature verification in accordance with one embodiment.

FIG. 3 is a flowchart illustrating an example of a method of signature verification that can be performed using the systems and methods of FIGS. 1 and 2 in accordance with one embodiment of the systems and methods described herein. First, a reference signature can be captured in step 300. The reference signature can, e.g., be captured using an electronic signature pad at a bank, as described above with respect to FIGS. 2A-2B. The captured reference signature from step 300 can include one or more signatures. These signatures can then be stored in a memory for future use to verify future signatures. The features and aspects of the signature or signatures that are stored will be discussed further below.

In step 302 a signature to be verified can be captured. The signature to be verified can be captured at a merchant location as described above. This signature to be verified can be compared to a reference signature in step 304 using time series analysis. Time series analysis will be described further below. In step 306 the signatures can be compared in the spectral domain and a match can be determined in step 308. Spectral domain analysis will also be discussed further below.

In one embodiment the spectral domain analysis can occur when the time series analysis does not yield an adequate result. For example, in some cases time series analysis can determine to a high probability that a signature to be verified is authentic, or to a high probability that a signature to be verified is not authentic; however, in other cases, and with some signatures, the result can be less conclusive. In other words, the time series analysis can in some cases be unable to determine to a high degree of certainty that the signature either is, or is not authentic. In this case, for example, a wavelet transform analysis can be used to determine if the signature to be verified is authentic or not authentic.

Thus, the process described in FIG. 3 combines non-linear time series analysis and time and frequency related spectral analysis. A time series is a set of samples taken over a period of time. These time series samples can also be represented as spectral information in the frequency domain. Both the time series and the spectral information can be analyzed to perform signature verification. For time series analysis, the similarity measurement of an on-line signature $S={}^1s^M=s_1,\ldots s_M$ and a reference $R={}^1r^N=r_1,\ldots r_M$ can be based directly on the distance between time series signals. Distance can be how close one or more attributes are to each other. As will be discussed further below distance may have little to do with physical distance between pen strokes.

Each time series signal can be a pattern series, e.g., of sample points. The variety of writing speeds, both of each individual, and between different individuals has to be considered when comparing each set of time series signals to determine a minimum distance. Since writing speed can vary, the number of sample points is not necessarily identical. Each pattern series can be ordered in a way that a minimum value of the calculated distance can be achieved. In other words, each sample signature and/or reference signature can be adjusted to take into consideration the different number of sample points that can comprise the pattern series for each signature.

Even though a reference signature and a sample signature can be the same text a simple difference in the time series for each can lead to a comparison of different parts of the signatures, if these possible differences are not considered. This effect is known as non-linear time distortion. One way to adapt for differences in time series, e.g., non-linear time distortion, can be an adaptation of the time axis. For example the centers of each time series can be aligned and/or compared to each other. Similarly, the edges of each time series can be aligned and/or compared to adjust for the non-linear shift of the writing signals based on the writing speed.

Thus, a possible assignment from a signature to a reference is defined by a suitable time adaptation model (warping function). The time adaptation model can describe the transition $\delta_k$ between two successive pairs of sample points using the equation below:

$$\delta_{k\tau}=v_\tau-v_{\tau-1}=(m_\tau-m_{\tau-1},n_\tau-n_{\tau-1}) \text{ with } \tau=2,\ldots,L \text{ and}$$
$$ {}^1v^L=v_1,\ldots v_L$$

In this equation $v_\tau=(m_\tau,n_\tau)$. The set $\Delta$ of possible transition $\kappa$ between successive sample points of signature and reference is defined as $\Delta=\{\delta_1,\ldots,\delta_K\}$ with $\delta_\kappa=(\delta_\kappa^1,\delta_\kappa^2)$. For a symmetric standard model the set $\Delta$ is defined as $\Delta=\{(0,1),(1,1),(1,0)\}$ and transitions between direct neighbors are allowed. The similarity between signature S and reference R can be determined by the distance of assignments. An assignment can be calculated, e.g., the using dynamic programming. For optimization, single-stage models are often used. This means the calculation of the transition probabilities only depends from the immediate (direct) or the calculated predecessor.

In one embodiment a simple warping function like the symmetric standard model can be used. A simple warping function like the symmetric standard model allows only transition from the left, the diagonal or lower predecessor. Horizontal transitions like $\delta^1=0$ or $\delta^2=0$ within the warping function lead to stretched sample points in a signature over many sample points of a reference. More detail, e.g., due to more samples in one signature, can cause greater numbers of constant sections. Vertical transitions can be especially problematic due to, e.g., two sample points of a signature being assigned to one sample point of the reference. While this effect is less important for generated, synthetic rough signals, it should not be neglected when comparing real-world signals like handwritten signatures. Furthermore constant sections influence spectral analysis of handwritten signatures.

The advantage of vertical and horizontal transitions is that it allows the modeling of additions, omissions and/or time distortions. Signatures very often display partial omissions if they are written with high speed. A renunciation of vertical and horizontal transition within the warping function model results in rise transitions. Usually, the rise will be limited and warping functions will be smoothed.

In certain embodiments, the distances can be weighted for performing the comparisons. In other embodiments, instead of weighting the distances, a stochastic model for dynamic programming including an additive time distortion can be used. Further, the symmetric standard model as well as the rise limited model adapts every sample point of a signature and a reference.

Additions and omissions within signatures can lead to widespread wrong assignments if every sample point is analyzed. Already small shifts lead to differences within the spectral analysis based on, e.g., wavelet functions. As a result, the systems and a methods described herein can make use of the points that are of most interest in the warping process.

The writing points of most interest are defined by their wave form importance. The importance of a writing point can be calculated using the following equation:

$$M(i)=\sum_{n=k}^{\alpha_-\le\alpha_{max}}(\cos(\alpha_-(n))\cdot\cos(\alpha_+(n)))$$

In the above equation i=selected writing point, $\alpha_{max}$=border arc, $\alpha_-$=arc to left neighbor, $\alpha_+$=arc to right neighbor, n=selected neighbor, k=starting neighbor. The model for the most important writing points are based on the assignment of points with similar behavior within a signature and a reference. Points with similar behavior are likely to be similar points in the signing of the signature, even if the timing of the signatures varies between each of the signatures being compared. To detect the local differences the time difference to the predecessor is used instead of a time index. Local differences can be more likely to be related, while specific time indexes may very greatly, as described above. To compare time differences relative distances are used instead of an absolute value.

Time series bases can usually be analyzed by dissection each signature into basic wave forms. A spectral analysis can be used when handwritten signature's function is transformed into the frequency domain. Fourier and Fast Fourier Transformation are the most common techniques for transforming the time based signature data into the frequency domain. Both transforms are based on the use of the complex exponential function $e^{i\omega t}$ as the basic function. The disadvantage of both transform techniques is the necessary time interval $t \in (-\infty, +\infty)$ which has to be considered. Additionally, the Fourier spectrum does not contain information about the chronological order. The basic functions used in Fourier and Fast Fourier transforms determine only the frequencies present over all time. But the frequencies present at any specific time are not determined. The spectral contents of a physiological signal like a handwritten signature, however, changes during the writing movement. Frequency analysis techniques that measure time specific frequency content in accordance with the systems and methods described herein can include Fourier Transforms in combination with a windowing function and wavelet transforms, both discussed below.

To use a Fourier Transformation for determining time related statements usually a window function limits the time series. A well known window function is the Gabor function $g(t-\tau)e^{i\omega t}$ with g=Gauss function. This window Fourier transformation delivers a two-dimensional picture depends on frequency and time. This method, however, contains following disadvantage: the window size for every basic function is constant. For that reason the distribution of frequencies within a frequency—time—diagram is linear. This does not correspondence to the natural, e.g., logarithmic frequency distribution that is common for human senses, e.g., the human sense of hearing. Since writing also involves human senses many characteristics of writing can be modeled as logarithmic. Since many characteristics of writing can be modeled as logarithmic a diagram that models frequency linearly can have disadvantages, e.g., it can be difficult to discern details since they can be drowned out by the large range of possible values. In other words, a signal may be contains important features in different expansions, e.g., chronological extensions, different signature time portions, can each have different frequency values.

In one embodiment a method can be used which can take into account the large range of possible values. The method can use wavelet techniques. When using wavelet techniques the spectral window size can depend on frequency at a specific time, this can be referred to as local frequency values.

There are existing connections between wavelet analysis and signal analysis, which allow a spectral analysis of signatures based on wavelet analysis. The wavelet transformation can be implemented as a finite impulse response filters also known as quadrature mirror filters which allow a wavelet dissection of the signature signals. A dyadic dissection of the frequency resolution is achievable by successive usage of filter banks.

Figure 4:
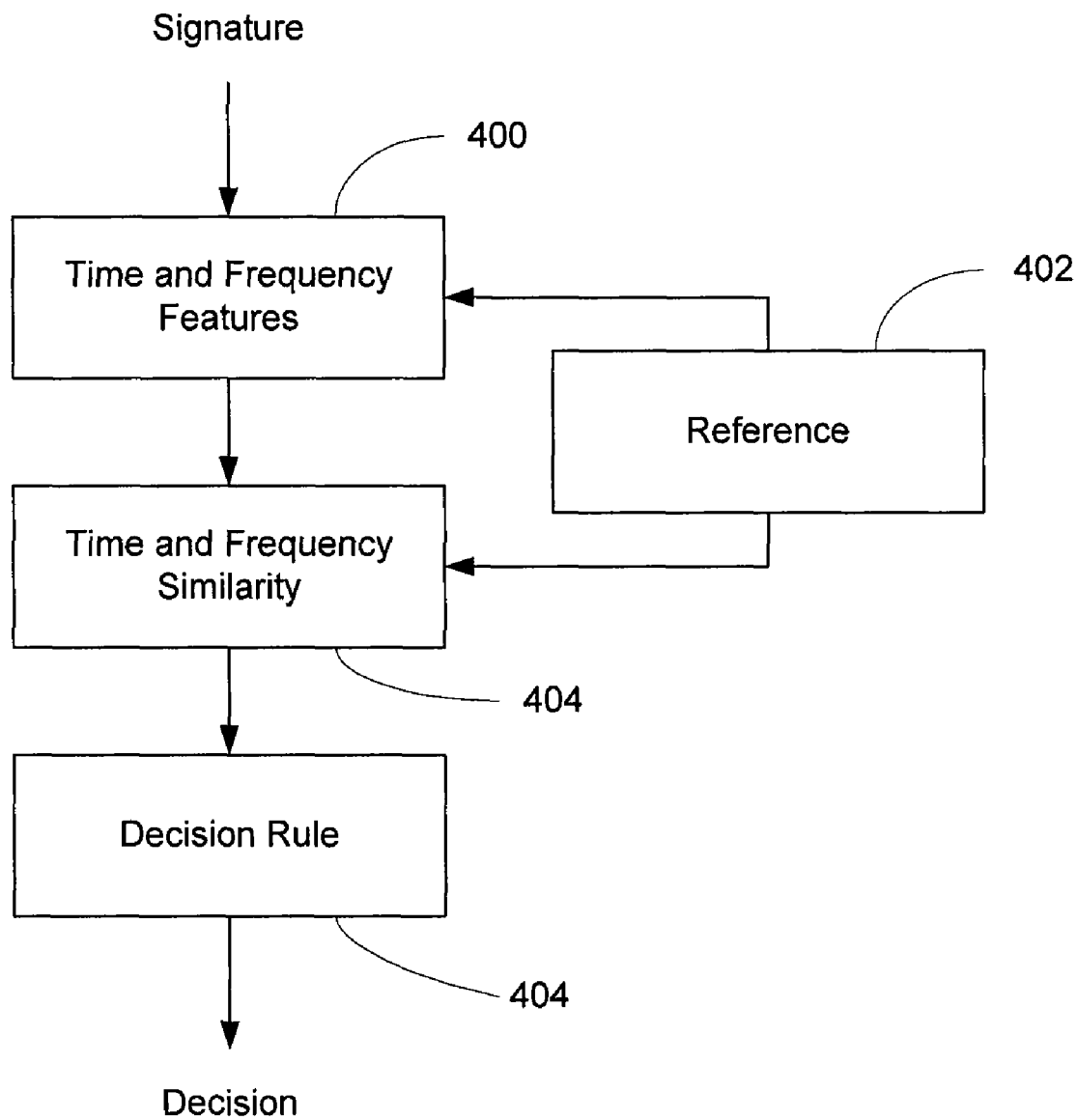
FIG. 4 is a diagram illustrating an example method of signature verification.

Thus, FIG. 4 is a diagram illustrating a more detailed example method of signature verification in accordance with one embodiment of the systems and methods described herein. A signature to be verified can be compared to a reference signature 402 using time and frequency features 400. Time and frequency features can include, for example distance of time adaptation, distance of time distortion, Euclidian distance, quadratic Euclidian distance, and quadratic distance between vectors. Recall that distance, as used herein, is not necessarily a linear distance. Distance will be described further below.

These time and frequency features 400 can be compared for similarity 404. The comparison can be done using a reference and a current sample. The reference can be composed of one or more sample signatures, and/or data derived from the one or more sample signatures. The comparison can be done by, for example, comparing each of the distance values, distance of time adaptation, distance of time distortion, Euclidian distance, quadratic Euclidian distance, and/or quadratic distance between vectors. Based on the similarity or lack of similarity the time and frequency comparisons can be combined using a decision rule in step 404 to come to a decision regarding the authenticity or lack of authenticity of a signature. The decision rule can, for example, combine one or more distances to determine the authenticity or lack of authenticity of a signature.

Figure 5:
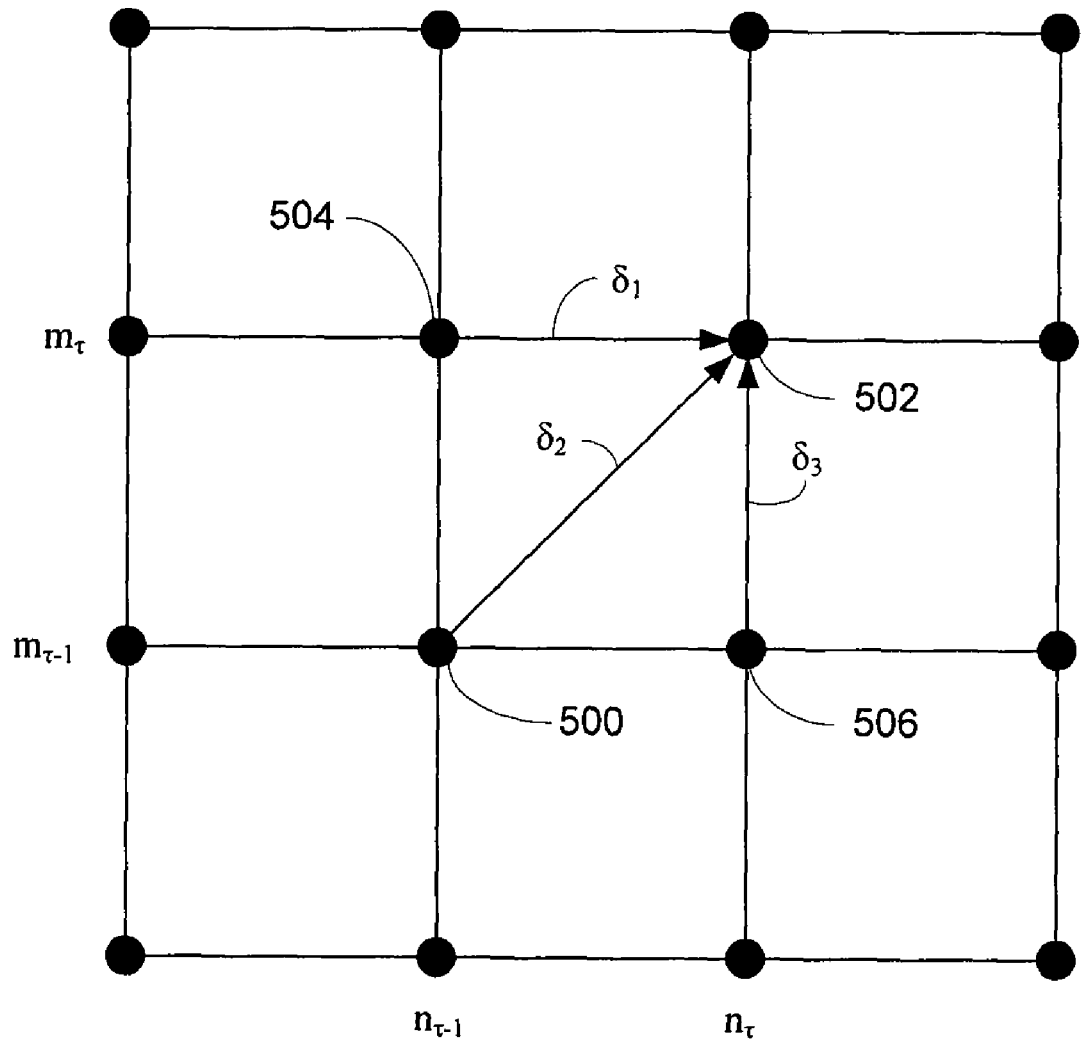
FIG. 5 is a diagram illustrating an example of a symmetric standard model warping function.

FIG. 5 is a diagram illustrating an example of a symmetric standard model warping function in accordance with the systems and methods described herein. The warping function can be used to compare multiple signatures, e.g., two signatures, a reference signature made up of multiple sample signatures and a signature to be verified, sample signatures used to make up a reference signature, etc. In the example below the warping function will be described with respect to comparing two signatures.

The closer the match between two signatures, the shorter the "distance" between them. Distance can be how close one or more attributes of the signature are to each other. For example, if pen pressure is compared between two signatures, the closer the pen pressure of the first signature is to the pen pressure of the second signature, the lower the "distance" between them. As can be seen from the example, "distance" may have little to do with physical distance between pen strokes of two different signatures. It will be understood, however, that x-y location of the pen strokes of two different signatures, for example, can be one of the attributes. Distance will be further explained with reference to FIG. 5.

The diagram illustrates two different time functions. The function m can be a function of a reference signature, while the function n can be a function of a signature for comparison. The functions m and n can be, for example, functions of horizontal movement, vertical movement, horizontal pressure, vertical pressure, velocity, acceleration, etc. It will be understood that for a comparison to be valid m and n should be functions of the same signature attribute, e.g., acceleration of the signature for comparison should be compared to acceleration of a reference signature, not some other attribute.

The diagram includes point 500, which represents an attribute of a signature to be compared at some time in the past, a time $\tau-1$. This time can be one sample before the current time, however, in many cases; the input device used can take many more samples than are needed. For this reason, some samples from the input device can be skipped, e.g., we can process every other sample, every tenth sample, every one hundredth sample, every five hundredth sample, etc. For example, some capture devices capture a sample every nanosecond. People do not move the pen fast enough to acquire any new useful information.

Point 502 represents an attribute of the signals to be compared at the current time $\tau$. As can be seen in the diagram, you can get from point 500 to point 502 by three different paths. These paths are labeled $\delta_1$, $\delta_2$, and $\delta_3$. Path $\delta_2$ starts at point 500, proceeds directly to point 502. This can be the shortest path between points 500 and 502. In other words, path $\delta_2$ can be the shortest distance. When an attribute of the signals to be compared matches path $\delta_2$ can be selected. The distance between the two signatures is minimized since path $\delta_2$ is the shortest path. The greater the number of identical attributes between two signatures, the greater the number of times the shortest path $\delta_2$ can be selected. For example, if two attributes are selected, the shortest path possible would have a "distance" of $2*\delta_2$. This "distance" would indicate an exact match. Generally, many more than 2 attributes will be compared to determine if the signatures match.

When an attribute of the signatures does not match, another path can be selected. Path $\delta_1$ starts at point 500, proceeds to point 504, and completes at point 502. This path proceeds along an outside portion of a square made up of points 500, 504, 502, and 506. Path $\delta_3$ starts at point 500, proceeds to point 506, and completes at point 502. This path also proceeds along an outside portion of a square made up of points 500, 504, 502, and 506. As drawn in the figure, the paths $\delta_1$ and $\delta_3$ appear to be the same length, however, it will be understood that each path can be assigned a different distance such that, e.g., $\delta_1$ is a shorter distance than $\delta_3$.

For example, assume that an attribute of two signatures that is to be compared does not match exactly, but is close; in this case, $\delta_1$ can be selected. Further, if a second attribute is an exact match, the distance for that attribute can also be $\delta_2$. The total distance would therefore be $\delta_1+\delta_2$. In the two attribute example this can be short enough to indicate a match, while perhaps distances of $\delta_1+\delta_3$, $\delta_2+\delta_2$, $\delta_3+\delta_3$ can indicate that the two signatures are not a match. Again, it will be understood that generally many more than two attributes will be used to compare the signatures. Additionally, more or fewer than three different paths, and therefore, more or fewer than three distances can be used. The relationship between the distances of each path can also vary from implementation to implementation. For example, in one implementation $\delta_3$ can be three times "longer" than $\delta_1$ and $\delta_2$ can be two times "longer" than $\delta_1$. In another implementation $\delta_3$ can be ten times "longer" than $\delta_1$ and $\delta_2$ can be four times "longer" than $\delta_1$.

As described above, a symmetric standard model warping function can be used to compare signatures within a reference signature. A reference signature can be made up of attributes of several sample signatures. The reference signature can be an average of each attribute of each signature. The "distance" between each attribute of each signature that makes up the reference signature can be compared, for example, to be sure that none of the sample signatures within the reference are a forgery or an otherwise incorrect signature.

Figure 6:
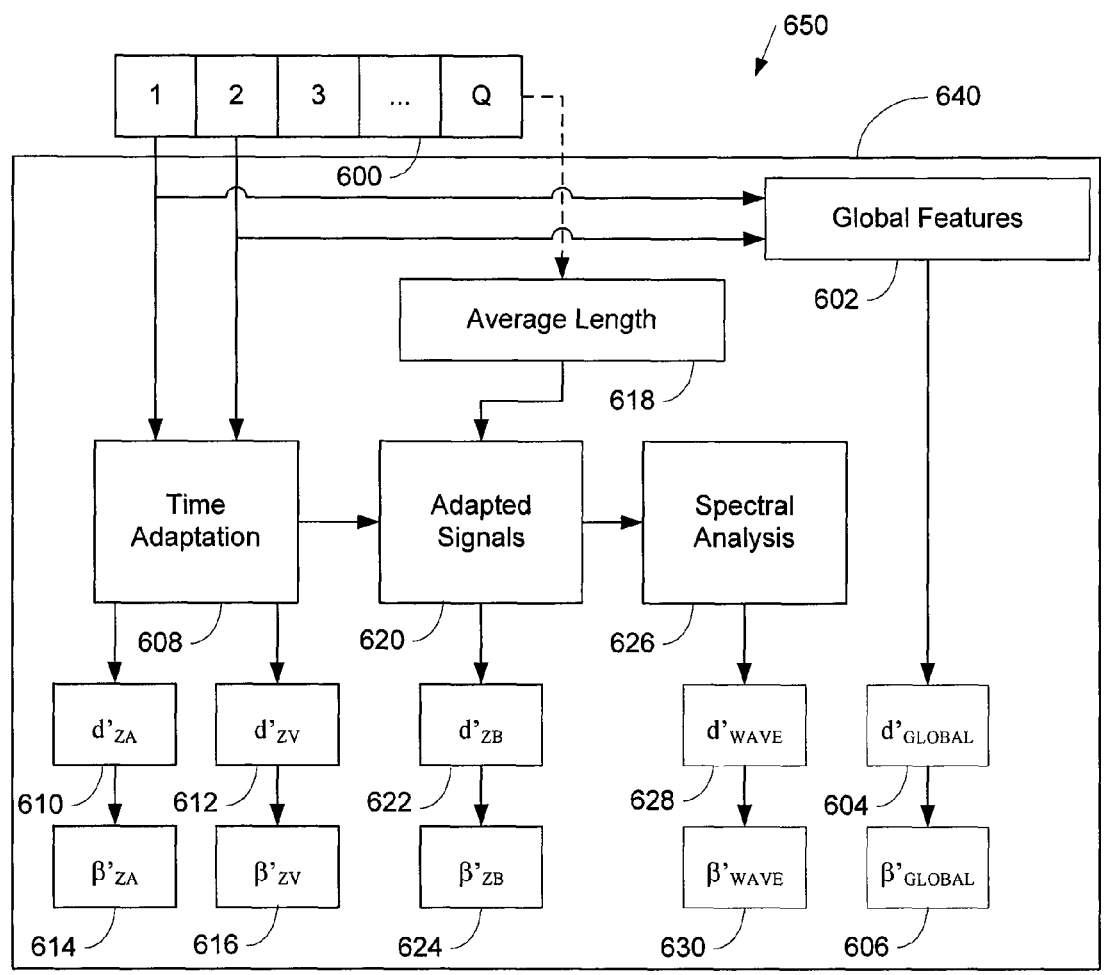
FIG. 6 is a diagram illustrating an example of time-spectral analysis for an enrollment process.

FIG. 6 is a diagram illustrating an example of time-spectral analysis for an enrollment process in accordance with the systems and methods described herein. During enrollment the variability of the acquired data of an individual can be determined. These determinations can be carried out by calculating the variation of one or more distances describing signature similarity. Signatures can be time adapted using dynamic programming and transformed using wavelet analysis. The similarity between signature s and reference r can be calculated by comparing the distance value $d_z(s,r)$. These distance values can be determined, for example, using the distance calculation methods of FIG. 5. Additionally, the distance value can consist of different components. In other words, distances can be calculated for many different aspects of a signature. For example, non-linear time adaptation value $d_{ZA}(r,s)$, time distortion $d_{ZA}(r,s)$, distance of time adapted signals within time series domain $d_{ZB}(r,s)$, distance of wavelet transformation of time adapted signals $d_{Wave}(r,s)$, and distance of global features $d_{Global}(r,s)$.

In addition to the different distance values that can be calculated, the variation $\beta$ of the individual distances d' can be calculated. This variation can be the result of pair wise comparisons of reference signatures and sample signature to determine distances for each pair wise comparison. These distances can be added together to determine a total distance that can be used to determine if the signatures are a match or if the signatures are not a match.

The non-linear time adaptation of signature $^1s^M$ and reference signature $^1r^N$ lead on one hand to the result of dynamic programming $d_{ZA}(r,s)=D(M,N)$ and on the other hand to time adaptation path $^1v^L$.

The time distortion can be determined from time adaptation path $^1v^L$ or from the transition order $\delta_{kl}$. The time distortion is the result of the relative relation of the time differences. One possibility is to weight total writing time of each signature and use the ratio of each to compare the signatures around time distortion of transitions. The time distortion can be determined using the equation below, for example:

$$d'_{ZV}(r^p, s^q) = \sum_{l=1}^{L} (rel(\Delta t_l^p, \Delta t_l^q) + 1)^2 \frac{\Delta t_{l_q}}{T} d(\delta_{k_l}).$$

The distance of adapted signals can be based on, e.g., spline interpolated signatures. The time adapted signals can be compared locally in time. Because of normalization the local distance value can be calculated as special case of Mahalanobis distance using the following equation:

$$u_t = \|\vec{r}_t^p - \vec{s}_t^q\|_2^2 = \sum_{d=1}^{D} (\vec{r}_{dt}^p - \vec{s}_{dt}^q)^2.$$

The determined distance is then determined using equation:

$$d'_{ZB}(r^p, s^q) = \sum_{t=1}^{T} u_t.$$

The distance of the wavelet transformation of the time adapted sample signature and the time adapted reference signature can be compared coefficient by coefficient. Frequencies above writing process are not included. For example, frequency components that are higher than a person can generate by physical movement of a writing instrument, are likely to be the result of electronic noise. These signals are random and will not enhance the ability of the system to detect matching signatures or eliminate forgeries since the signals are not generated by the person signing his or her signature.

When comparing signatures using wavelets, single wavelet coefficients can be compared with the quadratic Euclid distance. Details may be emphasize with a factor $c>1$ or reduce with factor $c<1$. The distance can be calculated, for example, with the following equation:

$$d'_{wave}(r^p, s^q) = \sum_{j=0}^{a-1} c\|s_{b,j}^p - s_{b,j}^q\|_2^2 + \sum_{i=0}^{b_0-1} \sum_{j=0}^{a \cdot 2^i - 1} c^i \|d_{b,j}^p - d_{b,j}^q\|_2^2.$$

The distance of the global features like median of writing velocity, average of writing pressure, total writing time can be determined at the beginning of dynamic programming and can be summarize as vector g. The vectors can be compared component by component with this equation:

$$d'_{global,k}(r^p, s^q) = (g_k^p - g_k^q)^2$$

For each vector compared, $d'_Z$ of $Q(Q-1)$ pairs of reference signatures, the distance variation, $\beta$, can be defined as $$\beta_Z = \frac{1}{Q(Q-1)} \sum_{i=1}^{Q(Q-1)} d'_Z(r^{pi}, s^{qi})$$

with $z \in \{ZA, ZB, ZV, Wave, global\}$. The range of variation allow comparison of the distances of each vector compared, using equation:

$$d_z(r, s) = \frac{d'_z(r, s)}{\beta_z}.$$

This means that the signatures have an average distance of 1 between each other.

In FIG. 6 sample signatures and reference signatures, numbered 1 through Q can be processed using time-spectral analysis. For example, during enrolment, each signature of a reference can be processed using time-spectral analysis. Additionally, after enrollment, a sample signature or signatures can be compared to a reference signature. The variability of the acquired data of each individual signature can be determined. This can be done by calculating a variation spread of distances for each signature. Again, these signatures can be sample signatures, signatures within a reference, reference signatures, etc. Each pair of signatures, 1 and 2, 2 and 3, 1 and 3, etc. can be processed for global features in Global Features block 602. The distance for each global feature can be determined as was described with respect to FIG. 5. This distance can be determined in block 604. The variations of the distance of each global feature between each pair of signatures can be determined in block 606. This is an indication of how different each global feature is between different signatures.

When comparing two signatures to each other the signatures can, in some cases be signed over different lengths of time. In block 608 a pair of signatures can be time adapted so that the signature time of each signature is equal. By using the distance measuring methods described with respect to FIG. 5 the non-linear time adaptation value and the time distortion can be determined in blocks 610 and 612, respectively. The time distortion can be used to time adapt one signature to another. This can be done, for example, by calculating the time distortion and changing one signal to be the same length of time as the other signal. Variations of time adaptation and time distortion can be determine in blocks 614 and 616.

The average length of each signature can be calculated in block 618. This information can be combined with the time adapted signals in block 620 to determine the distance of the adapted signals in block 622 and the variation can be calculated in block 624.

Similarly, in bocks 626, 628, and 630 a spectral analysis can be performed, distance between each of the signatures can be determined, and variations of distance can be determined. Some or all of the variations discussed can be used to determine the authenticity of one or more signatures. For example, more variation between signatures can indicate a higher probability that the signatures do not match.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed is:

1. A method of handwritten signature verification comprising:
    at a first location obtaining reference signature data in the form of time series data relating to a plurality of attributes of at least one reference signature;
    dynamically capturing time series data as a signature to be verified is made at a second location, the dynamically captured time series data relating to a plurality of attributes of the signature to be verified, the time series data of the signature to be verified being obtained without tracing, at least one of said at least one reference signature and said signature to be verified being obtained with a signature capture device coupled to a processor;
    comparing attribute data of the reference signature to attribute data related to the dynamically captured time series data of the signature to be verified using time series analysis, wherein a processor is programmed to perform time series analysis;
    comparing attribute data of the reference signature to attribute data related to the dynamically captured time series data of the signature to be verified using spectral analysis, wherein the processor is programmed to perform spectral analysis, the comparison being based upon at least two sets of attribute data from each of the at least one reference signature and at least two sets of attribute data from the signature to be verified; and
    determining if the signature to be verified matches the reference signature based on the comparisons.

2. The method of claim 1, wherein the spectral analysis comprises a wavelet transform.

3. The method of claim 1, wherein the step of obtaining time series data of at least one reference signature comprises capturing time series data from a plurality of reference signatures.

4. The method of claim 1, wherein the signature data captured for the at least one reference signature and the signature to be verified comprises pressure data in the form of time series data.

5. The method of claim 1, wherein the signature data captured for the at least one reference signature and the signature to be verified comprises velocity data.

6. The method of claim 1, wherein the signature data captured for the at least one reference signature and the signature to be verified comprises acceleration data.

7. The method of claim 1, wherein the signature data captured for the at least one reference signature and the signature to be verified comprises signature location data.

8. The method of claim 1, wherein the signature data captured for the at least one reference signature and the signature to be verified comprises pressure data, velocity data, and acceleration data.

9. The method of claim 1, wherein the at least one reference signature comprises a dynamic signature.

10. The method of claim 1, wherein the signature to be verified comprises a dynamic signature.

11. The method of claim 1, wherein the first location and the second location are the same location.

12. The method of claim 1, wherein the first location comprises a bank.

13. The method of claim 1, wherein the second location comprises a merchant location.

14. A signature comparison system comprising:
a memory configured to store instructions; and
a processor coupled with the memory, the processor configured to access the memory and execute the instructions, the instructions configured to cause the processor to:
cause dynamic reference signature data in the form of time series data relating to a plurality of attributes associated with at least one reference signature to be captured;
cause dynamic signature data in the form of time series data relating to a plurality of attributes associated with a signature to be verified to be captured dynamically as it is made, the time series data characteristic of the signature to be verified being obtained without tracing;
compare the dynamic data associated with the reference signature to the dynamic data associated with the signature to be verified using time series analysis;
compare the reference signature to the signature to be verified using spectral analysis with the comparison being based upon at least two sets of attribute data from each of the at least one reference signature and at least two sets of attribute data from the signature to be verified; and
determine if the signature to be verified matches the reference signature based on the comparisons.

15. The system of claim 14, wherein the spectral analysis comprises a wavelet transform.

16. The system of claim 14, wherein capturing dynamic signature data associated with the at least one reference signature comprises capturing such data associated with a plurality of reference signatures.

17. The system of claim 14, wherein the dynamic signature data captured for the reference signature and the dynamic signature data captured for the signature to be verified comprises pressure data in the form of time series data.

18. The system of claim 14, wherein the signature data captured for the at least one reference signature and the signature to be verified comprises velocity data.

19. The system of claim 14, wherein the dynamic signature data captured for the at least one reference signature and the dynamic signature data captured for the signature to be verified comprises acceleration data.

20. The system of claim 14, wherein the dynamic signature data captured for the at least one reference signature and the dynamic signature data captured for the signature to be verified comprises signature location data.

21. The system of claim 14, wherein the dynamic signature data captured for the at least one reference signature and the dynamic signature data captured for the signature to be verified comprises pressure data, velocity data, and acceleration data.

22. The system of claim 14, comprising a scanner coupled to the keypad and configured to capture signatures.

23. The system of claim 14, comprising an electronic signature pad coupled to the processor and configured to capture signatures.

24. The system of claim 23, wherein the signature pad is located at a merchant location.

25. A method of handwritten signature verification comprising:
at a first location obtaining reference signature data in the form of time series data relating to a plurality of attributes of at least one reference signature;
dynamically capturing time series data as a signature to be verified is made at a second location, wherein the captured time series data relates to a plurality of attributes of the signature to be verified, at least one of said at least one reference signature and said signature to be verified being obtained with a signature capture device coupled to a processor;
using time series analysis to compare time series data of the reference signature to dynamically captured time series data of the signature to be verified, wherein a processor is programmed to perform time series analysis;
using spectral analysis to compare time series data of the reference signature to the dynamically captured time series data of the signature to be verified, wherein the processor is programmed to perform spectral analysis; and
determining if the signature to be verified matches the reference signature based on the comparisons.

26. A method of handwritten signature verification comprising:
at a first location obtaining reference signature data in the form of time series data relating to a plurality of attributes of at least one reference signature;
dynamically capturing time series data as a signature to be verified is made at a second location, wherein the captured time series data relates to a plurality of attributes of the signature to be verified, at least one of said at least one reference signature and said signature to be verified being obtained with a signature capture device coupled to a processor;
using time series analysis to compare time series data of the reference signature to dynamically captured time series data of the signature to be verified, wherein a processor is programmed to perform time series analysis; and
after determining that the signature to be verified does not match the reference signature when using time series analysis, then using spectral analysis to compare time series data of the reference signature to the dynamically captured time series data of the signature to be verified, wherein the processor is programmed to perform spectral analysis and determining if the signature to be verified matches the reference signature based on the comparisons.

* * * * *